United States Patent
Saylor

[11] Patent Number: 5,821,992
[45] Date of Patent: Oct. 13, 1998

[54] FOCAL PLANE ARRAY CAPACITANCE CANCELLATION

[75] Inventor: Richard Saylor, Lake Hopatcong, N.J.

[73] Assignee: Raytheon Company, Lexington, Mass.

[21] Appl. No.: 799,821

[22] Filed: Feb. 13, 1997

[51] Int. Cl.$^6$ .................................................. H04N 5/33
[52] U.S. Cl. ................................................ 348/164; 250/332
[58] Field of Search .................................. 348/164, 241, 348/257; 250/332; H04N 5/33

[56] References Cited

U.S. PATENT DOCUMENTS

| | | | |
|---|---|---|---|
| 5,083,204 | 1/1992 | Heard | 250/332 |
| 5,489,776 | 2/1996 | Lung | 250/332 |
| 5,528,035 | 6/1996 | Masarik | 250/332 |
| 5,548,329 | 8/1996 | Klatt | 348/164 |
| 5,591,973 | 1/1997 | Masarik | 250/332 |

*Primary Examiner*—Howard W. Britton
*Attorney, Agent, or Firm*—W. C. Schubert; G. H. Lenzen, Jr.

[57] ABSTRACT

A video buffer of a focal plane array (FPA) electrical interface module is presented for providing output capacitance cancellation. The buffer has a capacitance cancellation stage (50) for receiving an analog signal produced by a FPA. The cancellation stage (50) includes an amplifier having a gain greater than unity for amplifying the analog signal and positive feedback capacitor for reducing power requirements and providing an increased pixel rate for the system. A dc restoration stage (52) is included for setting the analog signal to a dc level that is required by an external system and a line driving stage (54) for driving a video cable from the buffer to the external components of the system.

20 Claims, 6 Drawing Sheets

FOCAL PLANE ARRAY CAPACITANCE CANCELLATION

BACKGROUND OF THE INVENTION

1. FIELD OF THE INVENTION

The present invention is directed to thermal imaging systems, and is more particularly directed to a focal plane array electrical interface module having a video buffer which reduces focal plane array output capacitance.

2. DESCRIPTION OF RELATED ART

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a focal plane array (FPA) having a plurality of photoelectrically responsive detector elements perpendicular to the scan direction. Each of these detector elements provides an electric signal proportional to the flux of infrared light on the particular detector element which are subsequently processed by system sensor electronics to create an image for display on a system output device.

The FPA components of imaging systems are produced by various manufacturers. Efforts were initially made by these manufacturers to meet a common set of functional requirements. However, because of varying processes, techniques, and design approaches, this was found to be an unattainable goal. In addition, forcing all of these organizations to use the same approach was found to be costly and would, in addition, preclude the pursuit of parallel developments before one of the developers had proven itself as being a superior supplier. Therefore, in order to accommodate the varying FPA designs, the approach taken was to design optical, mechanical, and electrical interfaces which take the FPA variations into account.

Based upon an analysis of existing FPA configurations, a set of differences have evolved that must be accounted for when producing an interface module. For an electrical interface module, this includes the number and level of bias voltages, number and timing requirements of clock signals, logic levels, method of deselecting defective pixels, integration of time requirements, multiplexer rates, and the output level and impedance of video lines.

The output level and impedance of video lines is important due to the fact that the focal plane array is cooled to reduce parasitic thermal noise and increase the sensitivity of the elements. The cooling is conventionally accomplished with an evacuated chamber that houses the focal plane array and an associated cooling apparatus, which is referred to as a dewar assembly.

The dewar assembly is generally cooled by a cryogenic cooler that maintains the focal plane array at a specific cryogenic temperature in order to provide optimal performance of the imaging system. Because a significant amount of power is required to charge and discharge the output capacitance of the FPA output stages for every change in signal amplitude, a considerable amount of heat is generated which must be subsequently removed by the cooling apparatus. Therefore, the power requirement for the cryogenic cooler can be significant. In order to increase overall imaging system efficiency, it is therefore desirable to reduce the power requirement of the cryogenic cooler, which may be accomplished by reducing the output impedance of the FPA video lines.

The output capacitance is also a limiting factor for the transient response of the imaging system. Normally, a number of detectors are multiplexed onto each output line of the FPA by multiplexers that are part of the focal plane. It is important the transient response of the output stage be much faster than the period of one multiplex cycle. Otherwise, the output signal will not settle to its true value for one detector element before the multiplexer switches to another detector. Thus, the reduced output capacitance helps to ensure adequate transient response.

Therefore, it is the object of the present invention to provide a system and methodology for accommodating the electrical variations of FPA design in such a way as to produce a common module.

It is also an object of the present invention to provide a video buffer within the electrical interface which negates the output capacitance of the FPA, thereby reducing the power requirement of the imaging system's cryogenic cooler.

It is a further object of the present invention to provide a system and methodology which improves the system transient response, thereby increasing the pixel rate at which the imager may operate.

SUMMARY OF THE INVENTION

In accordance with the teachings of the present invention, a video buffer of a focal plane array (FPA) electrical interface module is presented for providing output capacitance cancellation. The buffer has a capacitance cancellation stage for receiving an analog signal produced by a FPA. The cancellation stage includes an amplifier having a gain greater than unity for amplifying the analog signal and positive feedback means for reducing power requirements and providing an increased pixel rate for the system. A dc restoration stage is included for setting the analog signal to a dc level that is required by external components of the system and a line driving stage for driving a video cable from the buffer to the external system.

BRIEF DESCRIPTION OF THE DRAWINGS

Other objects and advantages of the invention will become apparent upon reading the following detailed description and upon reference to the following drawings, in which:

FIG. 3 (a–b) is a voltage versus time graph showing the dc restoration stage input, output, and corresponding voltage input to the clamp gate;

DESCRIPTION OF THE PREFERRED EMBODIMENTS

The following description of the preferred embodiments is merely exemplary in nature and is in no way intended to limit the invention or its application or uses.

Figure 1:
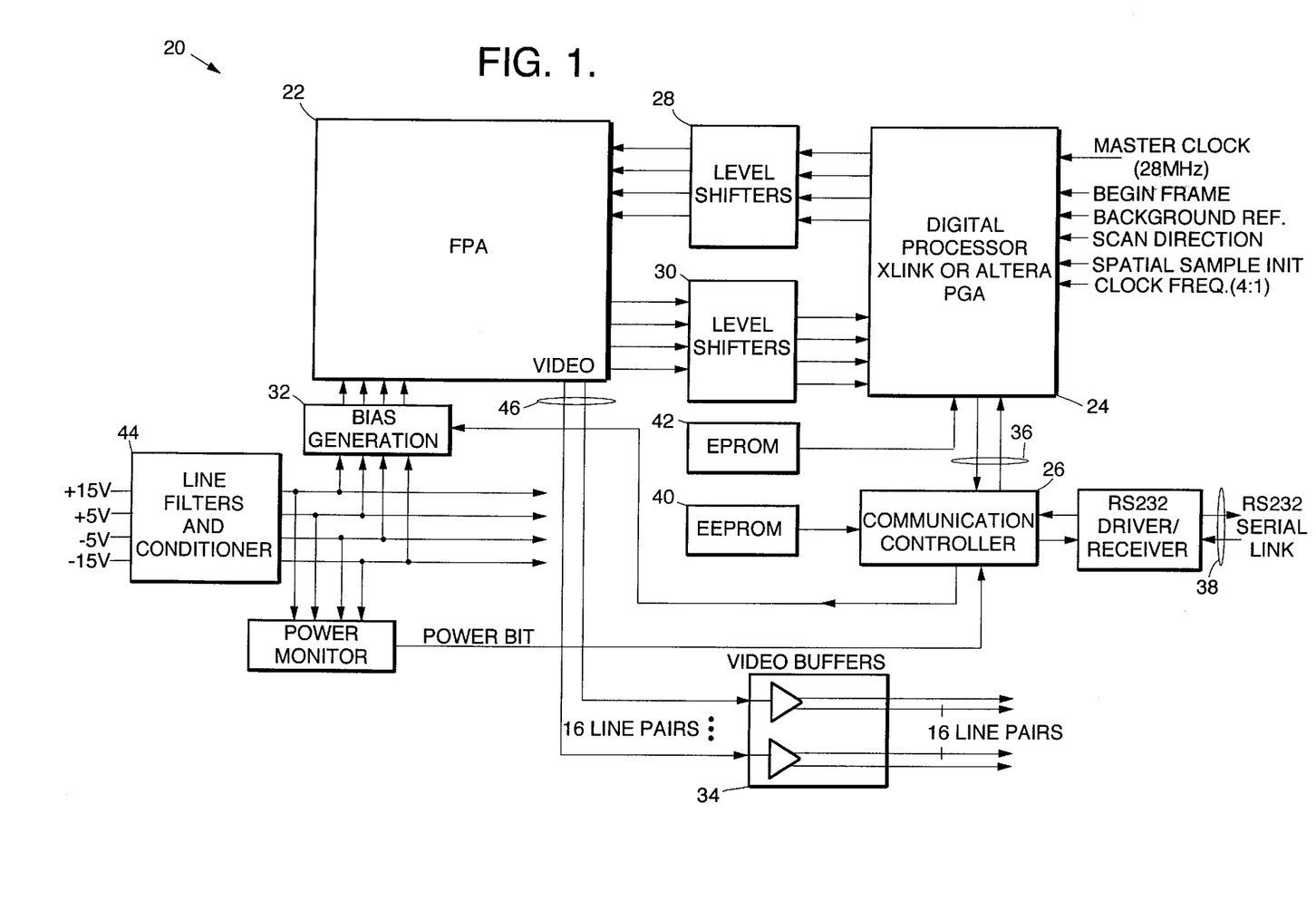
FIG. 1 is a block diagram of the electronics interface module having the video output buffer of the preferred embodiment of the present invention.

Turning to FIG. 1, the interface module 20 provides the electrical interface between a focal point array 22 (FPA) and external components of a thermal imaging system.

The interface module 20 provides outputs to and receives inputs from the external system. The external system can be any of a number of types of infrared systems. This includes imaging systems for target detection or target tracking, line scanning systems for aerial survey, or surveillance systems for nighttime monitoring. What all of the systems have in common is the need for an infrared detector array and the ability to perform additional signal processing as tailored for the particular application. The configuration presented provides the features which make the interface module 20 easily configurable to focal plan arrays of various manufacturers. The interface module 20 includes a digital processor 24, communication controller 26, level shifters (28,30), bias generator 32, and video buffer 34.

Generally, the FPA 22 will require clock functions that do not match the logic signals as supplied by the master clock of the imaging system. In order to keep the interface electronics flexible so that common hardware may be used for different FPAs, a programmable logic array is used as a digital processor 24. The digital processor 24 is used to provide clock and other logic signals that are unique to a particular FPA. Using this approach, a unit can be configured for a different type of FPA by reprogramming an ultraviolet (UV) erasable device.

A data path 36 is provided between the communication controller 26 and the digital processor 24, with information provided in both directions. This allows information received on the RS-232 link 38 to be available to the digital processor 24, and logic data received by the digital processor 24 can be provided to the communication controller 26. This communication path allows modification to integration time and MUX rate for FPAs that do not perform the function internally. In addition, the BIT test functions and the de-selection of defective pixels will also take advantage of the bi-directional data path 36.

The pixel deselect scheme is performed by providing even illumination to the FPA and sequentially turning off all but one pixel of the time delay integration (TDI) sequence. By comparing the results, a defective pixel is detected. The defective pixel can then be deselected by addressing it and simultaneously asserting the deselect line. Normally, the identification of defective pixels is done by the FPA manufacturer and the pixel addresses are supplied by the FPA. When the FPA is integrated with the interface module 20, the defective pixel addresses are loaded into the EEPROM 40 for subsequent system adjustment.

BIT test functions are performed within the FPA 22 and the interface module 20. The specific FPA BIT test functions are determined by the FPA manufacturer. For example, the FPA BIT functions for one FPA design includes tests on the readout circuitry, the multiplexer, and the power supply. The interface module 20 provides the means by which to monitor these tests. In addition, the interface module performs tests of the communication controller 26, digital processor 24, EPROM 42, EEPROM 40, and input power.

The BIT test functions fall into three categories, tests performed at initialization, tests performed under external command via the RS-232 link 38, and tests performed on an ongoing basis and in a manner that does not interfere with normal system functions. The digital processor 24 will provide the means by which each of these self tests may be performed.

Tests of the communication controller 26, input power, EEPROM 40 and EPROM 42 are performed on an ongoing basis as well as during the other two categories. EEPROM 40 and EPROM 42 tests are accomplished by reading all data contained in each of the memory storage devices and performing a checksum that is compared with a stored value. The EEPROM 40 is also given a thorough test at power up by conducting a checkerboard read-write on every location. The communication controller 26 will be tested by performing a selected test of instructions and comparing the results with stored data.

The purpose of these tests is to provide an indication of proper overall operation, failures, permanence of failures, and provide the means for troubleshooting in order to localize a failure between the FPA 22 and the components of the interface module 20. This provides the means by which a malfunctioning component may be identified and replaced.

A history of self-test results will be maintained in the EEPROM 40. This is beneficial in that a history of failure events can be used to determine the nature of a problem, and the urgency of repair. With a history maintained within the EEPROM 40, an error can be identified as an initial failure or a repetition of previous failures. This data is retrievable by the user of the imaging system, and the user may reset the error record containing the history of tests results.

The level shifters (30, 32) provide the communication path for all logic signals. This includes signals to or from the FPA 22. The simple ability to add or delete the level shifters (30, 32) allows for simple integration with FPAs having varying requirements.

The communication controller 26 receives and stores the timing data and bias adjustment commands. The bias data is supplied via a digital port on the communication controller 26 to a dual digital-to-analog converter (not shown) contained in the bias generator 32. Because FPAs of different manufacturers require a wide range of bias voltages, multiple bias voltages are provided. In addition, the dual D/A converter is used to adjust up to two bias voltages that may require adjustment during normal operation to ensure that the FPA operates within an optimized dynamic range.

The communication controller 26 and digital processor 24 provide the timing data as required for operation of a given FPA. The timing parameters are provided to the communication controller 26 via the RS-232 link 38. The controller 26 evaluates the timing parameters and loads the registers in the digital processor 24 with the appropriate values. Based upon the loaded values, control programmable counters and logic circuits generate the appropriate timing signals for system operation.

The digital processor 24 is configured for FPAs from different manufacturers by programming the EPROM 42 which controls the functions of the digital processor 24. This configuration allows the loading of multiple programs for more than one type of FPA, which is selectable via the serial link 38.

The FPAs have critical requirements for grounding and power conditioning. Based upon these requirements, the input power supply to the FPA is physically and electrically isolated from the rest of the interface module components with the bias generator 32.

The video outputs 46 of the FPA 22 are buffered by a video buffer 34. The buffer 34 is composed of an array of amplifiers and is configurable to accommodate either current or voltage outputs from the FPA. The buffer 34 is intended to provide the gain as required in order to present a standardized output into a 75-ohm load.

Figure 2:
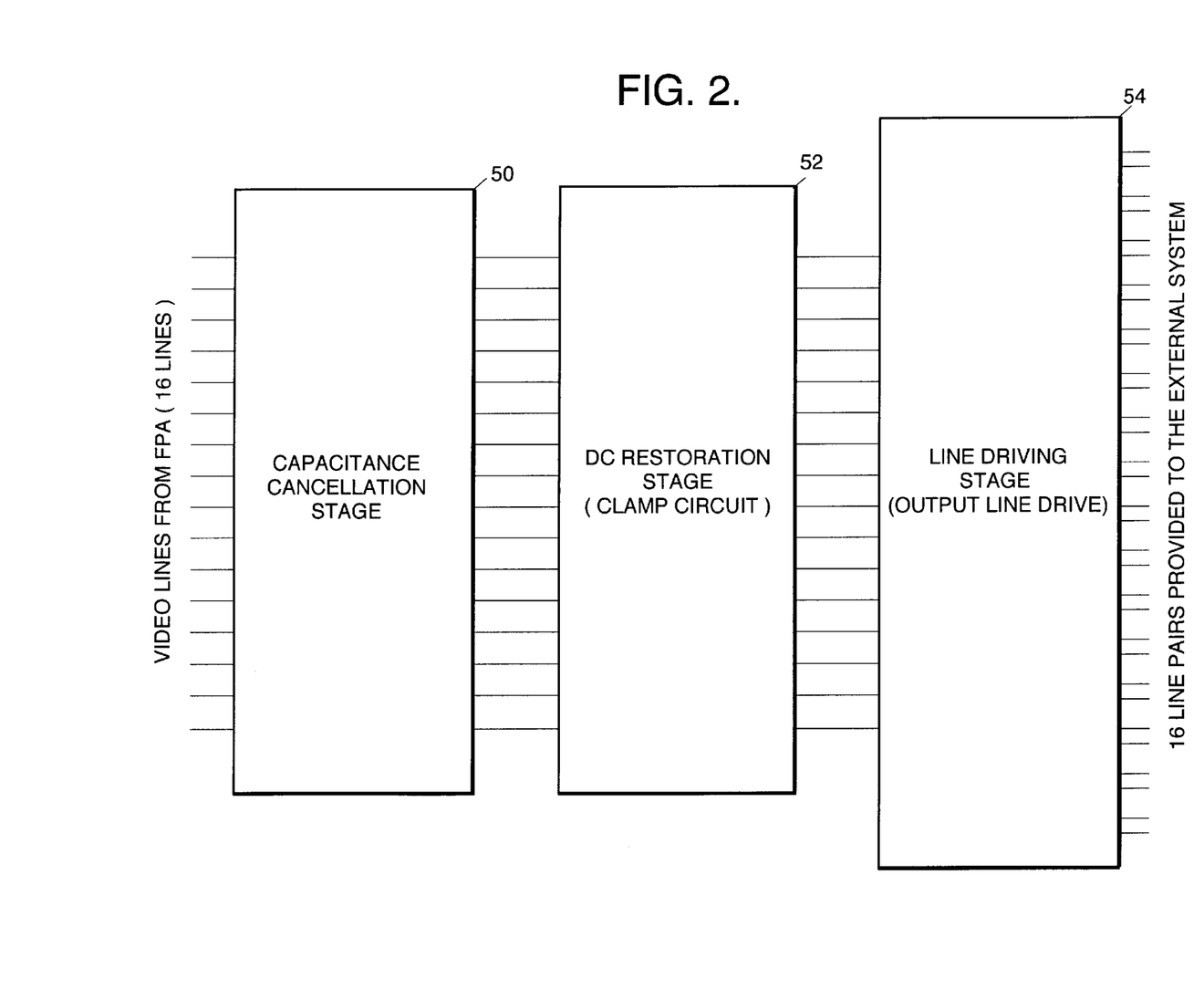
FIG. 2 is a block diagram of the basic components of the video buffer of the preferred embodiment of the present invention.

As shown in FIG. 2, the video buffer has three basic stages. The first is the capacitance cancellation stage 50, which will be subsequently described in further detail. The second stage is a dc restoration stage 52, and the third stage is a line driving stage 54 which is designed to drive the cable from the interface buffer to the external system.

Figure 3A:
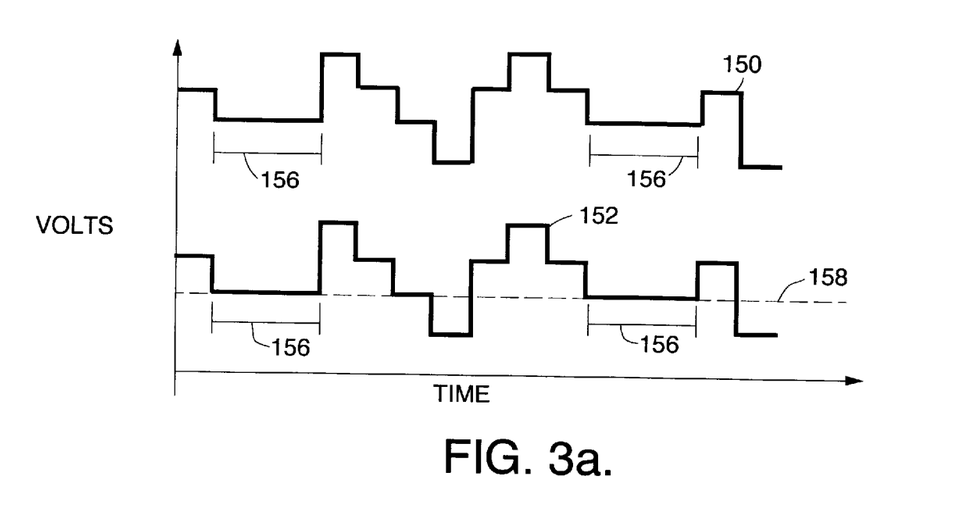
Figure 3B:
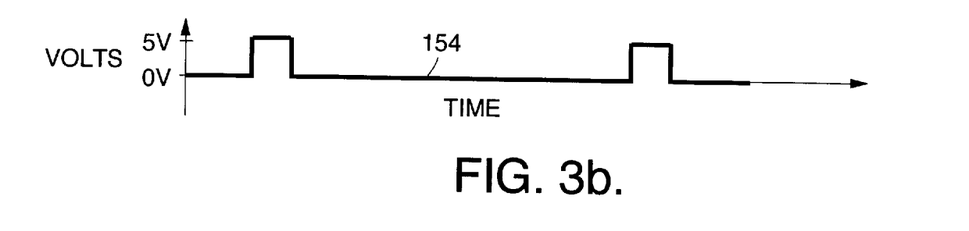

FIG. 3 presents an example of a dc restoration stage input waveform 150 and the resulting stage output 152 (shown in FIG. 3a), and the corresponding voltage input to the clamp gate 154 (shown in FIG. 3b). As can be seen, varying voltage levels are produced as the FPA multiplexer switches between detectors. In addition, the two waveforms (150,152) have quiescent periods 156 which correspond to intervals in which no detector is switched to the output, but rather, a fixed voltage level is applied by the FPA. This fixed level is generally a mid value and is often referred to as a grey level.

The resulting stage output represents just one of a number of system outputs. Because of variations in detector characteristics, each output may be at a slightly different voltage level. Furthermore, all the levels provided may be different than the level as required by the external system. Therefore, the dc restoration stage is provided to set all levels to the same value and to the value as specified by the external system. The technique employed to accomplish this task utilizes the quiescent periods 156. The dc restoration stage resets the level so that during the quiescent period, the waveform is set to a voltage value that is subsequently provided to the external system. This voltage value is referred to the clamp voltage 158.

Figure 4:
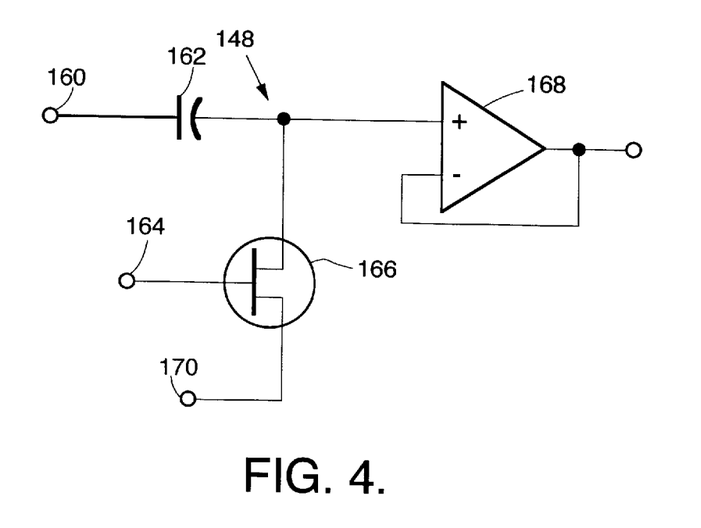
FIG. 4 is a circuit schematic illustrating the dc restoration stage in further detail.

FIG. 4 shows the dc restoration stage 148 in further detail. The stage input 160 is coupled to a capacitor 162. A clamp gate 164 turns on the Field Effect Transistor (FET) switch 166 during part of the quiescent periods and charges or discharges the capacitor 162 to the clamp voltage 170. After the quiescent period, the FET switch 166 is turned off. Because the capacitor 162 is tied to a unity-gain operational amplifier 168, which has a very high input impedance, the capacitor 162 cannot charge or discharge. Therefore, the output waveform follows the input waveform, but at a new dc voltage level. In this way, all of the outputs are set to the same dc level when provided to the line driver stage.

Figure 5:
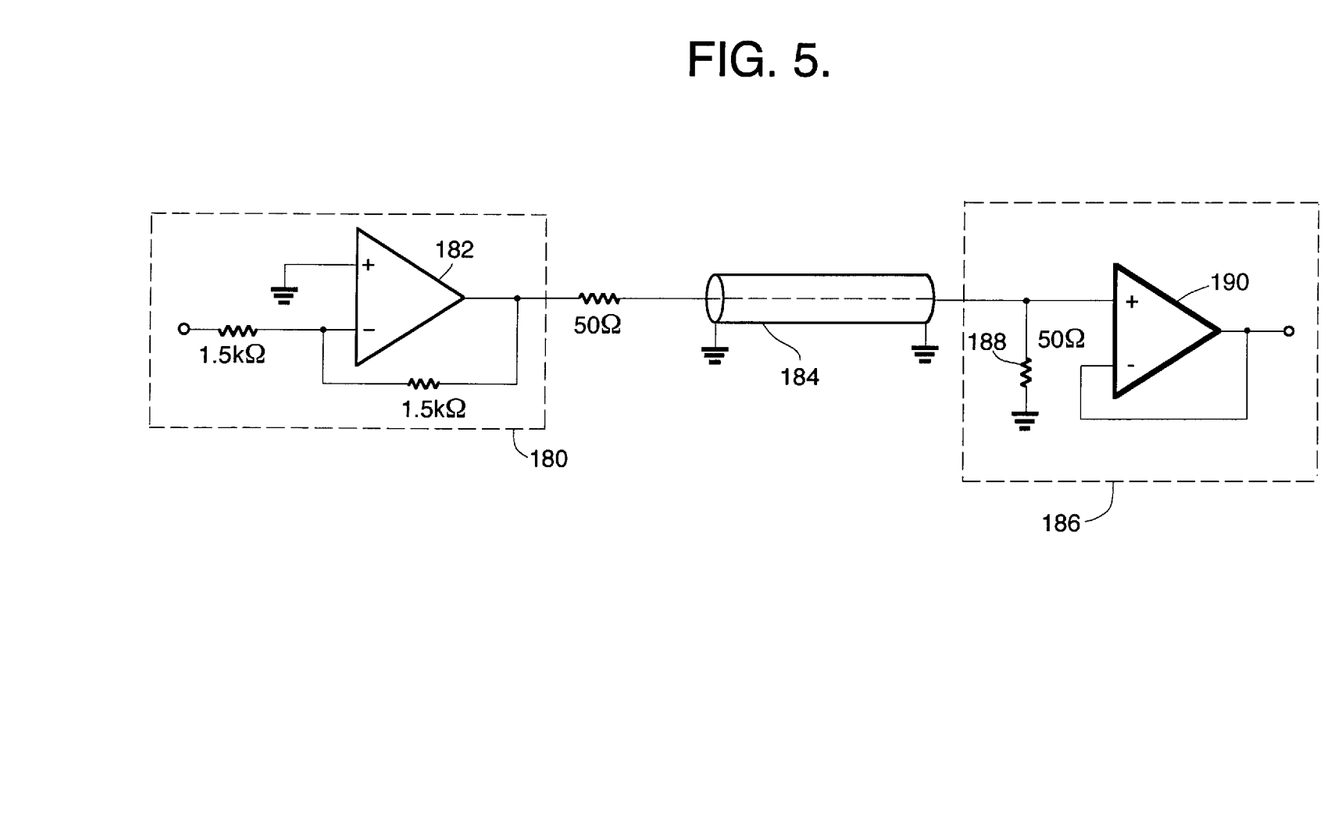
FIG. 5 is a circuit schematic illustrating the line driver stage in further detail.

FIG. 5 illustrates the line driver stage 180 in further detail. This stage 180 consists of a unity-gain inverting amplifier 182 and provides enough current to drive the coaxial cable 184 (typically a 50-ohm coaxial cable) that connects the FPA buffer to the external system 186. To ensure minimum distortion, the cable 184 must be terminated with the characteristic impedance of the cable. This means that the line driver 180 must be able to provide the full signal voltage (+or −2 volts) into a 100-ohm impedance. Therefore, the stage must provide 20 milli-amps of current in either direction without causing distortion. At the receiving end of the cable 184, the external system 186 provides the terminating resistor 188, and buffers the video signal with a non-inverting amplifier 190 that has a high input impedance so that the total impedance is not significantly reduced below the 50ohm value of the coaxial cable 186.

Figure 6:
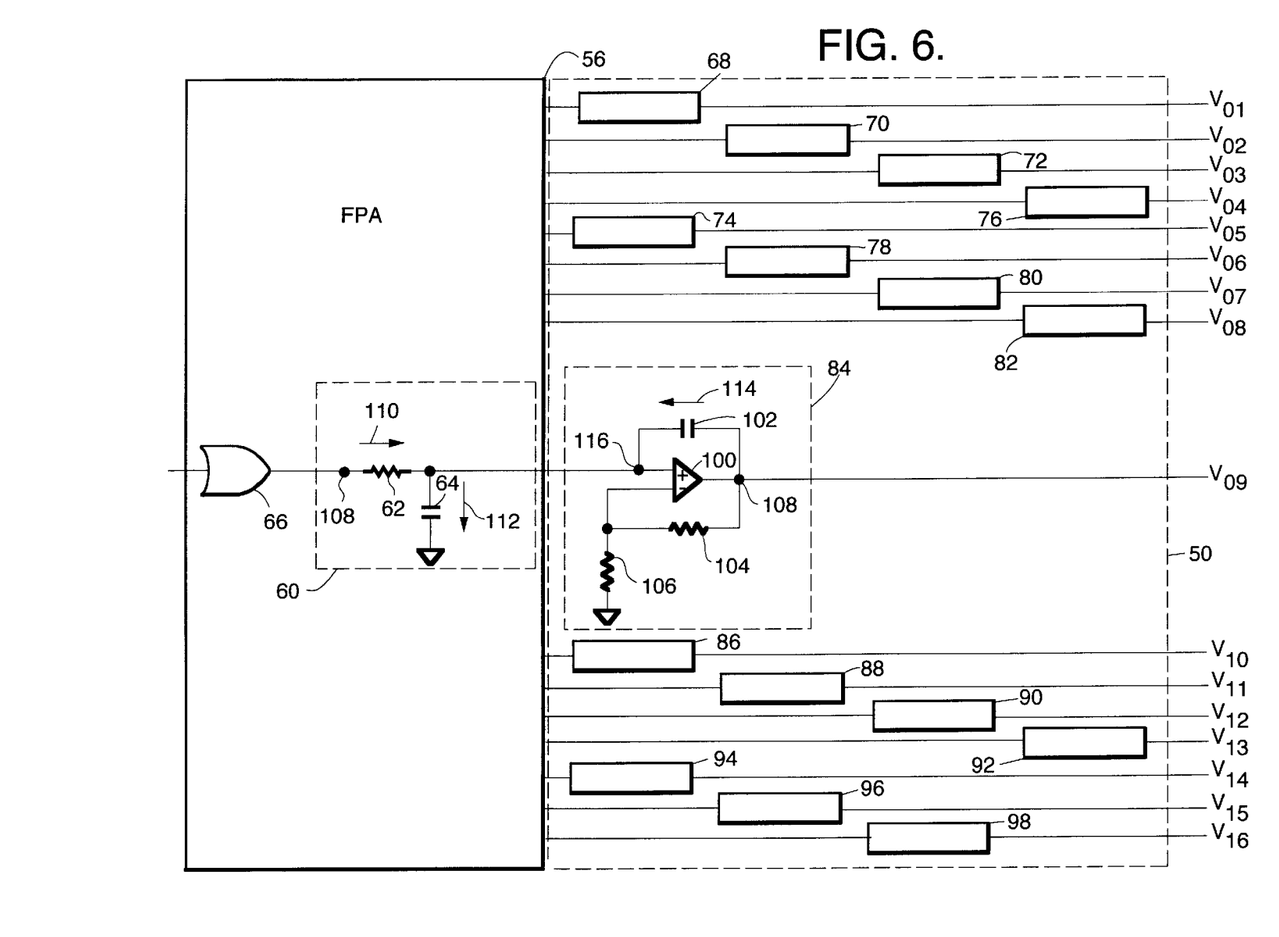
FIG. 6 is a circuit schematic of the first stage of the video buffer which provides the output capacitance cancellation.

FIG. 6 illustrates the capacitance cancellation stage 50 of the video buffer which receives the electric signals produced by the FPA 56. In order to maintain clarity in the following description, the elements composing only one of the channels is illustrated. However, it should be understood that this explanation is equally applicable to the other channels.

As previously indicated, it is desirable to have an FPA interface which negates the output capacitance of the FPA, thereby reducing the power requirement of the imaging system's cryogenic cooler. In addition, it is advantageous to improve the transient response in order to allow an increased pixel rate at which the imager may operate.

FIG. 6 includes the equivalent circuit of the FPA output stage 60. The FPA output stage 60 is a single-time-constant (STC) network, with a transient response determined by the FPA output resistance ($R_s$) 62 and FPA output capacitance ($C_s$) 64. Specifically, these two components make up the time constant (t') which represents the rise time (or fall time) of a signal, and which is determined by $$t_r = R_s C_s \tag{1}$$

From this equivalent circuit of the FPA output stage 60, it can be seen that the power dissipation consists not only of the power necessary to charge the FPA output capacitance ($C_s$) 64, but also the power dissipated in the FPA output resistance ($R_s$) 62 and in the output driver stage 66, which is usually a source follower CMOS transistor. This dissipation is a function of the signal amplitude as well as the value of the supply, and it is usually greater than the power required to charge the capacitance.

Based upon the foregoing, it can be seen that a reduction in the FPA output capacitance 64 would result in a significant improvement to the rise time (or fall time) of a signal and reduce the power dissipated. In order to accomplish the capacitance reduction, the amplification circuits (68, 70, 72, 74, 76, 78, 80, 82, 84, 86, 88, 90, 92, 94, 96, 98) are utilized for each FPA channel.

As shown in further detail for circuit 84, the circuit consists of a non-inverting amplifier 100 having positive feedback through the feedback capacitor ($C_1$) 102, with the requirement that the gain of the amplifier 100, as set by the first gain resistor ($R_1$) 104 and second gain resistor ($R_2$) 106, be greater than unity.

The goal for the design of this circuit 84 is to maximize the impedance presented to the internal signal source voltage ($V_s$) 108, therefore minimizing the source current ($i_s$) 110. If it is assumed that the bias current of the amplifier is small enough to be neglected, the source current ($i_s$) 110 can be expressed as:

$$i_s = i_1 - i_2 = V_2 j\omega C_s - (V_0 - V_2) j\omega C_1 \tag{2}$$

when $i_1$ is the current through the FPA output capacitance 112, $i_2$ is the current through the feedback loop 114, $V_2$ is the amplifier input voltage 116, and $V_0$ is the amplifier output voltage 118. The condition for minimizing the source current ($i_s$) 110 is therefore expressed as:

$$V_2 j\omega C_s = (K-1) V_2 j\omega C_1 \tag{3}$$

where K is the gain of the stage, namely:

$$K = \frac{R_1 + R_2}{R_2} \tag{4}$$

Solving equation (3) for the value of the feedback capacitor ($C_1$) results in:

$$C_1 = \frac{C_s}{K-1} \tag{5}$$

Therefore, if the feedback capacitor $C_1$ 102 is set to the value specified by equation (5), the source current ($i_s$) 110 will be minimized and furthermore, the amplifier input voltage ($V_2$) 116 equals the voltage of the internal signal source ($V_s$) 108 and the output voltage 118 ($V_0$) of the amplifier 100 is represented by:

$$V_0 = K V_s \tag{6}$$

This means that there is no current drawn from the point of the amplifier output voltage ($V_0$) 118 to dissipate power. In addition, the output voltage ($V_O$) 118 exhibits no degradation of transient response relative to the internal signal source ($V_s$) 108.

In practice, it is not feasible to obtain the full benefit described by the equations as previously provided. This is due to the fact that most amplifiers overshoot and instability results if the feedback capacitor ($C_1$) 102 is larger than specified by equation (5). Therefore, because of the various tolerances of the various parameters, it is necessary to keep ($C_1$) 102 somewhat smaller than specified. Normally, selecting a value which is 10% to 20% below that calculated in equation (5) will be adequate. Nevertheless, it is possible to obtain significant improvement in dissipation and transient response with the incorporation of the feedback capacitor ($C_1$).

Figure 7:
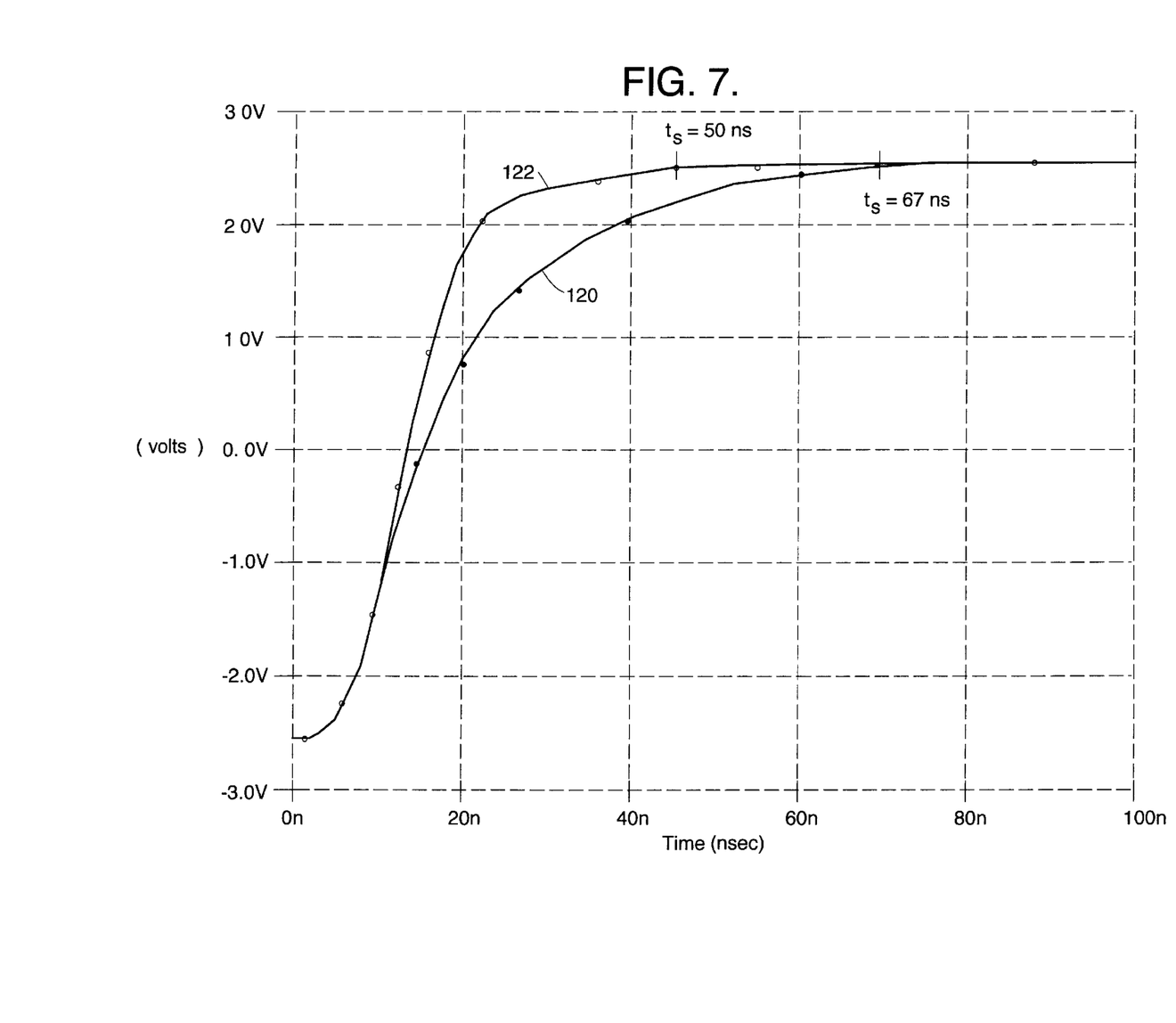
FIG. 7 is a voltage versus time graph showing the improved transient response of the preferred embodiment of the present invention.

FIG. 7 shows the responses to a step input when the amplification circuit does not have the feedback capacitor 120 and the response when the amplification circuit has the feedback capacitor 122. The step responses correspond to a configuration having a gain of 1.9. This was accomplished using a 1500 ohm resistor for the first gain resistor $R_1$ and a 1650 ohm resistor for the second gain resistor $R_2$. As can be seen, the response 122 with a feedback capacitance ($C_1$) of 10 pico farads, as calculated from the equations previously described, more accurately represents the step input. Furthermore, the response 122 with the feedback capacitance ($C_1$) reaches steady state in a shorter time period than the response provided by the buffer without the feedback capacitance ($C_1$), i.e., providing an improved transient response.

From the foregoing it can be seen that a system and methodology is provided for accommodating the electrical variations of FPA designs. This includes a video buffer which negates the output capacitance of the FPA which reduces the power requirements of the imaging system's cryogenic cooler. In addition, this system and methodology improves the transient response of a system, thereby increasing the pixel rate at which the imager may operate.

Various other advantages of the present invention will become apparent to those skilled in the art after having the benefit of studying the foregoing text and drawings, taken in conjunction with the following claims.

What is claimed is:

1. A video buffer of a focal plane array (FPA) electrical interface module for providing output capacitance cancellation, comprising:

a capacitance cancellation stage for receiving an analog signal produced by a FPA, said cancellation stage including an amplifier having a gain greater than unity for amplifying said analog signal, and said cancellation stage further including positive feedback means for reducing power requirements and providing an increased pixel rate for said system;

a dc restoration stage for setting said analog signal to a dc level of external components of said system; and a line driving stage for driving a video cable from said video buffer to said external components of said system.

2. The video buffer of claim 1 wherein said positive feedback means is a feedback capacitor.

3. The video buffer of claim 2 wherein the value of said capacitor is selected using the following relationship:

$$C_1 = \frac{C_S}{K-1}$$

wherein $C_1$ is said capacitor, K is the gain of said amplifier, and $C_s$ is the equivalent output capacitance of said FPA.

4. The video buffer of claim 1 wherein said FPA includes a plurality of photoelectrically responsive detector elements.

5. The video buffer of claim 1 wherein said amplifier is a non-inverting amplifier.

6. The video buffer of claim 1 wherein said gain is provided with a dual resistor configuration coupled to an input of said amplifier.

7. The video buffer of claim 1 wherein said cancellation stage receives a plurality of analog signals from said FPA.

8. The video buffer of claim 7 wherein said plurality of analog signals are proportional to the flux of infrared light received by said FPA.

9. A method for reducing the focal plane array output capacitance of a thermal imaging system, comprising the steps of:

(a) receiving an analog signal generated by said FPA with a video buffer;

(b) amplifying said signal with a video buffer amplifier having a gain greater than unity and producing an amplified analog signal;

(c) feeding said amplified signal through a positive feedback means for reducing power requirements and providing an increased pixel rate for said system;

(d) setting said analog signal to a dc level with a video buffer dc restoration stage; and (e) driving a video cable from said video buffer to external components of said system with an output line driver.

10. The method of claim 9 wherein said positive feedback means is a feedback capacitor.

11. The method of claim 10, further comprising the step of selecting said capacitor using the following relationship:

$$C_1 = \frac{C_S}{K-1}$$

wherein $C_1$ is said capacitor, K is the gain of said amplifier, and $C_s$ is the equivalent output capacitance of said FPA.

12. The method of claim 9 wherein step (a) is repeated so that a plurality of analog signals are received by said buffer.

13. The method of claim 9, further comprising the step of generating said analog signal which is proportional to the flux of infrared light received by a detector of said FPA.

14. The method of claim 9 wherein said amplifier is a non-inverting amplifier.

15. The method of claim 9 further comprising the step of selecting a first resistor having a first value and a second resistor having a second value, said step of selecting said first and second resistor values is conducted using the following relationship:

$$K = \frac{R_1 + R_2}{R_2}$$

wherein K is the desired gain of said amplifier, $R_1$ is said first value, and $R_2$ is said second value.

16. An electrical interface module for a thermal imaging system focal plane array (FPA), comprising:

a digital processor for generating timing and logic signals of said FPA;

a communication controller for receiving and storing timing data and bias adjustment commands of said FPA, said controller evaluating said timing data with the results provided to said processor;

a memory for storing instructions which control the operation of said processor; and a video buffer having output capacitance cancellation, said buffer receiving an analog signal generated by said FPA and producing a standardized output, said buffer including an amplifier having a gain greater than unity for receiving said analog signal and positive feedback means for reducing power requirements and providing an increased pixel rate for said system.

17. The electrical interface module of claim 16 wherein said positive feedback means is a feedback capacitor.

18. The electrical interface module of claim 17 wherein the value of said capacitor is selected using the following relationship:

$$C_1 = \frac{C_S}{K-1}$$

wherein $C_1$ is said capacitor, K is the gain of said amplifier, and $C_s$ is the equivalent output capacitance of said FPA.

19. The electrical interface module of claim 16 wherein said FPA includes a plurality of photoelectrically responsive detector elements.

20. The electrical interface module of claim 16 wherein said analog signal is proportional to the flux of infrared light received by said FPA.

* * * * *